United States Patent [19]

Kusama et al.

[11] Patent Number: 5,323,744
[45] Date of Patent: Jun. 28, 1994

[54] PISTON FOR INTERNAL COMBUSTION ENGINES

[75] Inventors: Kazunori Kusama; Hideki Yoshida, both of Kashiwazaki, Japan

[73] Assignee: Kabushiki Kaisha Riken, Tokyo, Japan

[21] Appl. No.: 28,187

[22] Filed: Mar. 9, 1993

[30] Foreign Application Priority Data

Jun. 22, 1992 [JP] Japan .................. 4-048996

[51] Int. Cl.5 .............................. F02F 3.00; F16J 1/08
[52] U.S. Cl. .................................... 123/193.6; 92/159
[58] Field of Search ........................ 123/193.6, 193.4; 92/158, 159

[56] References Cited

U.S. PATENT DOCUMENTS

| | | | |
|---|---|---|---|
| 1,462,501 | 7/1923 | Barwald | 123/193.6 |
| 2,860,934 | 11/1958 | Trevarthen | 123/41.35 |
| 4,013,057 | 3/1977 | Guenther | 123/193.6 |
| 4,073,220 | 2/1978 | Guenther | 123/193.6 |
| 4,282,837 | 8/1981 | Holtman et al. | 123/193.6 |
| 4,905,577 | 3/1990 | Schneeweiss | 92/159 |

FOREIGN PATENT DOCUMENTS

| | | |
|---|---|---|
| 491895 | 10/1949 | Belgium . |
| 2646922 | 4/1978 | Fed. Rep. of Germany . |
| 1423765 | 9/1988 | U.S.S.R. ............... 123/193.6 |
| 0500307 | 2/1939 | United Kingdom . |
| 0981862 | 1/1965 | United Kingdom . |
| 1344286 | 1/1974 | United Kingdom . |
| 2022213 | 12/1979 | United Kingdom . |
| 2028464 | 3/1980 | United Kingdom ......... 123/193.6 |
| 1599944 | 10/1981 | United Kingdom . |

*Primary Examiner*—Tony M. Argenbright
*Assistant Examiner*—M. Macy
*Attorney, Agent, or Firm*—Adduci, Mastriani, Schaumberg & Schill

[57] ABSTRACT

A piston for an internal combustion engine in which a land located immediately above an oil-ring groove and/or a pressure ring groove of the piston is provided with an annular groove-shaped recess at least around an intermediate portion of the land. The annular groove-shaped recess gradually increases in depth from zero upward along the axial direction of the piston to form an oil reservoir.

9 Claims, 7 Drawing Sheets

ID OF INTERNAL COMBUSTION
ENGINES

BACKGROUND OF THE INVENTION

1. Field of the Invention

This invention relates to improvements in a piston for internal combustion engines, particularly an improvement in the circumferential surface of the piston.

2. Description of the Prior Art

A prior art piston is illustrated in FIG. 10. The circumferential surface of the piston 1 of an internal combustion engine is provided with piston-ring grooves 5, 6, 7 for mounting one or two pressure rings 2, 3 and ordinarily a single oil ring 4 in the order mentioned starting from the side of the combustion chamber 17. A first land 8 is formed between an end portion of the piston 1 on the side of the combustion chamber 17 and the first ring groove 5, a second land 10 is formed between the first ring groove 5 and the second ring groove 6, and a third land 13 is formed between the second ring groove 10 and the third ring groove 7. More specifically, in case of a two-ring type arrangement having a total of two rings in which there is one pressure ring 2, an oil-ring groove is situated on the lower side of the second land 10. In case of a three-type arrangement in which there are two pressure rings 5, 6, the oil-ring groove 7 is situated on the lower side of the third land 13, as shown in FIG. 10.

If a space (referred to as second-land space 18 or third-land space 19) bounded by the land immediately above the oil-ring groove 7, the inner surface of the cylinder 9 and the piston rings on either side is too small, there is an increase in pressure owing to oil scraped from the piston 1, and leakage of oil occurs on the side of the combustion chamber 17, as a result of which a large amount of oil is consumed. This tendency becomes particularly pronounced when two pressure rings are used.

Furthermore, when the pressure in the above-mentioned space referred to as the second-land space 18 or third-land space 19 suddenly declines, the oil is drawn up into this space via the abutting end faces of the oil ring, the oil pressure rises and the amount of oil consumed increases. When the pressure in this space suddenly rises, the pressure ring immediately overlying it is lifted up, thereby causing a decline in the sealing property of this pressure ring.

Accordingly, in order to prevent a sudden fluctuation in pressure within the land space, the practice in the prior art, which is illustrated in FIG. 10, is to provide the land surface of a land 13 with a flat step 15 that forms a recess toward the side of the central axis of the piston 1 on the side of an oil-ring groove 7. The land 13 is cut away uniformly below the step 20 to increase the land space 19. However, in such an arrangement in which the land is cut away uniformly on the upper side of the oil-ring groove 7, a problem arises in a case where the oil ring is a three-piece assembly comprising upper and lower rails and an expander. Specifically, the problem is that the seating of the upper rail is degraded, thereby leading to a decline in sealability.

In addition to the above-mentioned matter, the demand for high speed rotation, compactness and high load for the internal combustion engines has recently increased year by hear. Furthermore, local regulations for purification of exhaust gas from the internal combustion engines have become stricter. In order to decrease the amount of hydrocarbon in the exhaust gas, the top ring 2 is located near a top crown surface 21 of the piston 1 as much as possible so as to decrease a crevice volume of a top land space 22 bounded by the first land 8, the inner surface of the cylinder 9 and the top pressure ring 2.

It will be easily understood that the top pressure ring 2 must have a suitable thickness (T-dimension) and width (W-dimension) in view of a sealing property and strength of the top pressure ring 2.

In this high top ring piston, the high inertia force of the top pressure ring 2 results from the high speed rotation of the piston 1 and in breakage of the top land 8. The thin first or top land 8 is subjected to a high temperature from the combustion chamber so that a thermal strength thereof is decreased and the top land 8 is likely to be more easily broken. To prevent the breakage of the top land 8, the top ring 2 is decreased in width and an inertia force thereof is made smaller. However, this measure is not suitable for reduction of the amount of oil consumption.

SUMMARY OF THE INVENTION

Accordingly, an object of the present invention is to provide a piston for internal combustion engines that solves the aforementioned problems.

Another object of the present invention is to provide a piston for internal combustion engines in which the volume of land space of the piston land immediately above the oil-ring groove and/or the top pressure ring groove is enlarged to prevent a sudden fluctuation in pressure within the land space.

A further object of the present invention is to provide a piston for internal combustion engines in which oil is accumulated in the aforementioned land space.

According to the present invention, the foregoing objects are attained by providing a piston for an internal combustion engine, comprising a piston body having an oil-ring groove, and a land formed in the piston body directly above the oil-ring groove and having a lower end face, the land having an intermediate portion a lower part of which is provided with an annular groove-shaped recess that does not extend down to the lower end face of the land, the annular groove-shaped recess gradually increasing in depth from zero upward along an axial direction of the piston body.

In an embodiment of the invention, the depth of the annular groove-shaped recess increases linearly. In another embodiment of the invention, the depth of the annular groove-shaped recess increases non-linearly.

According to the present invention, the foregoing objects are attained by providing a piston for an internal combustion engine comprising a piston body having a top pressure ring groove, and a land formed in the piston body directly below the top pressure ring groove and having an upper end flat face, the land being provided with an annular groove-shaped recess that does not extend up to the upper end flat face of the land, the annular groove-shaped recess gradually increasing in radial depth upward along an axial direction of the piston body.

Further, the objects of the present invention are attained by providing a piston having a second land which is provided with a recess and a third land which is provided with a recess.

In operation, the land space is increased in volume by providing the piston land lying directly above the second pressure ring groove and/or the oil-ring groove with an annular groove-shaped space the depth of which increases gradually upwardly along the length of the piston.

Though an oil reservoir is formed in the land portion, the cross sectional shape of the groove forming the space in the land becomes gradually shallower downwardly along the piston until the groove vanishes at the circumferential surface of the piston. Accordingly, the oil is blown toward the oil-ring groove by blow-by gas and the oil thus can be prevented from being drawn up. As a result, the amount of oil consumed can be made very small.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

Figure 1:
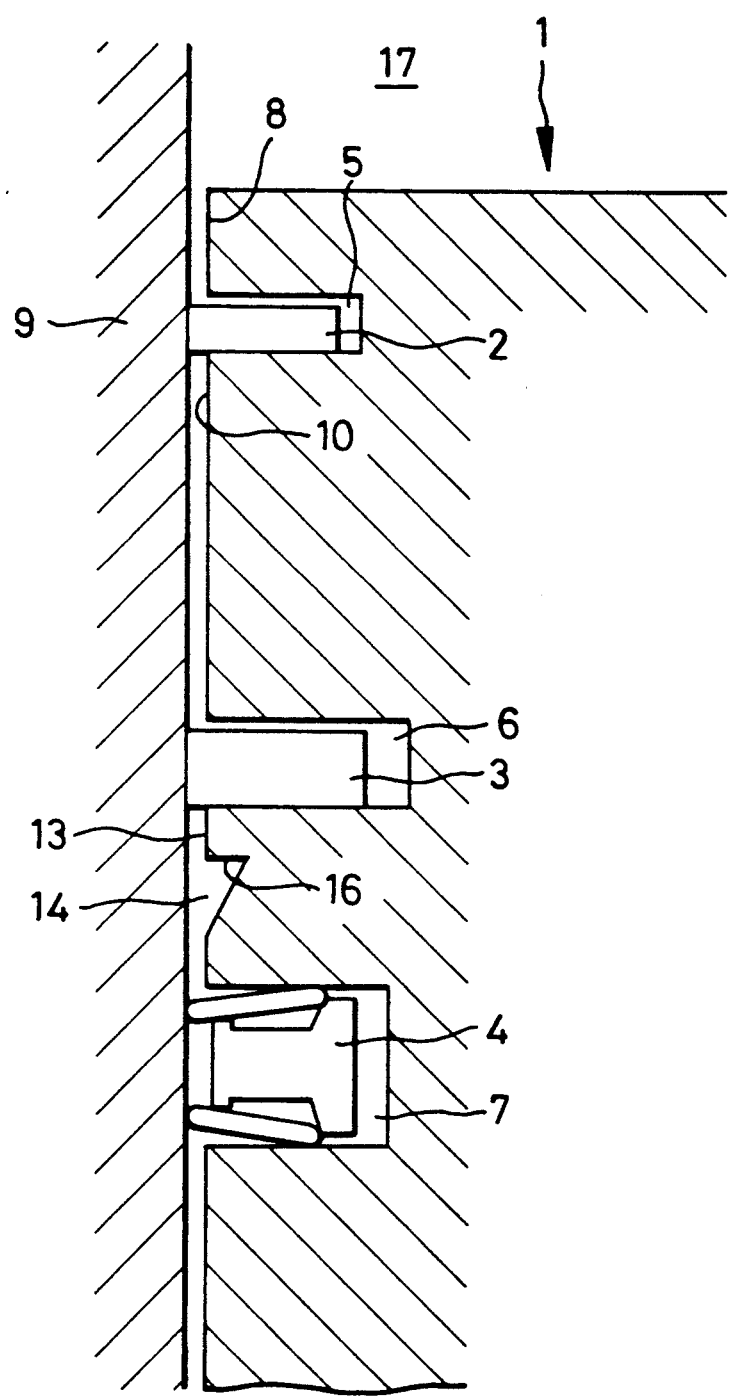
FIG. 1 is a sectional view illustrating a piston and a cylinder wherein a first embodiment of the present invention is included.

FIG. 1 is a sectional view showing a piston 1 having ring grooves 5, 6, 7, lands 8, 10, 13, pressure rings 2, 3 and an oil ring 4 of which each outer surface is brought into contact with an inner surface of the cylinder 9.

The piston land 13 has an intermediate portion provided with the step 16 that cuts into the usual third land surface 13, namely the outer circumferential surface of the piston 1, on the side of the oil-ring groove 7. Thus, the land 13 is cut inward below the step 16 to form a groove 14 that defines an oil reserving space. The groove 14 extends downward from the step 16 to a point located upward a slight distance from a portion of the piston 1 immediately overlying the upper side surface of the oil-ring groove 7. The depth of the groove 14 is zero at its lower end so that the bottom of the groove coincides with the outer circumferential surface of the piston 1, and gradually increases as the groove approaches the upper side of the land 13. In this embodiment, the depth to the bottom of the groove 14 varies linearly and the bottom surface is flat.

Figure 2:
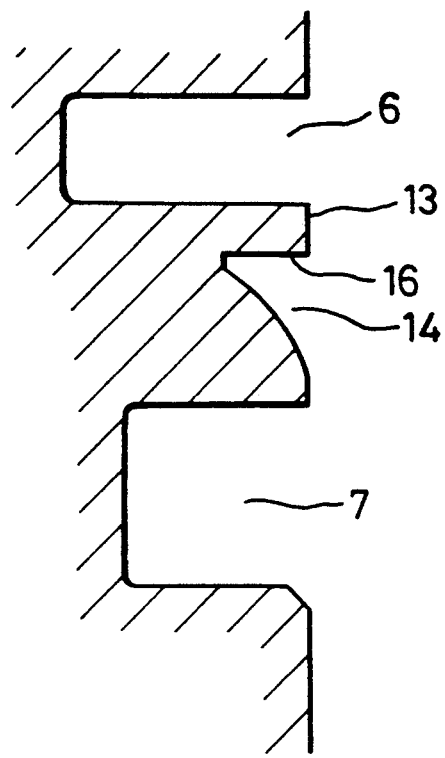
FIG. 2 is a sectional view illustrating a principal portion of a piston according to a second embodiment of the present invention.

It should be noted that the manner in which the depth of the groove 14 gradually increases from its lower end to its upper end is not limited to a linear change. In a second embodiment of the invention, as shown in FIG. 2, the groove 14 has a convex-shaped arcuate cross section so that the above-mentioned change is non-linear. The effects obtained, however, are the same.

Figure 3:
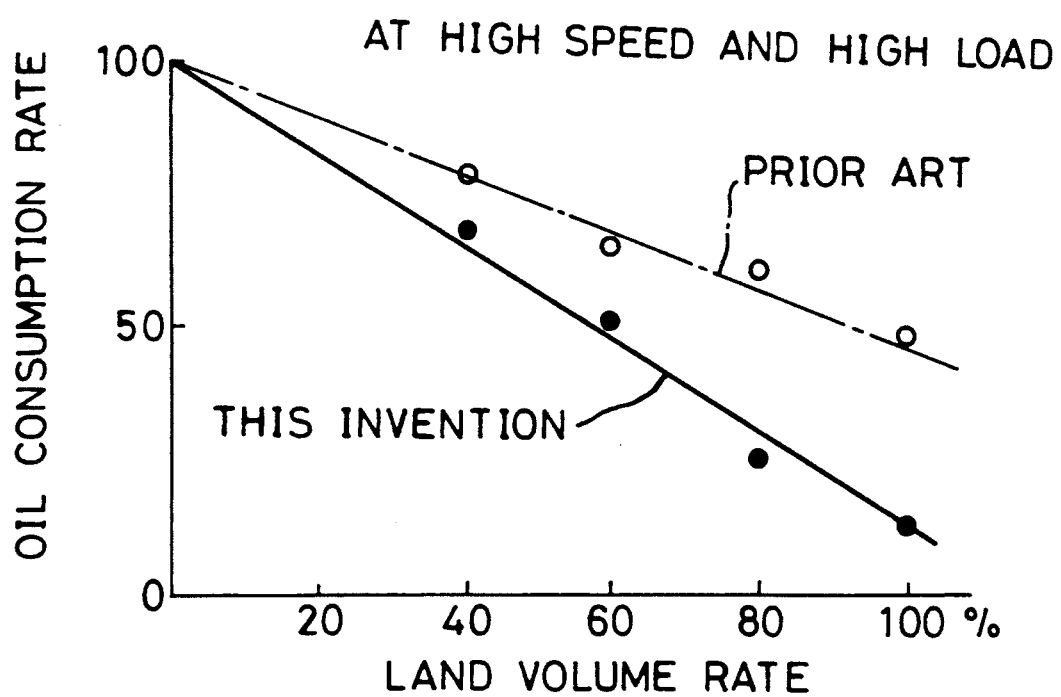
FIG. 3 is a graph showing an example of the differences in oil consumption efficiency between a piston according to the invention and a piston according to the prior art.
Figure 10:
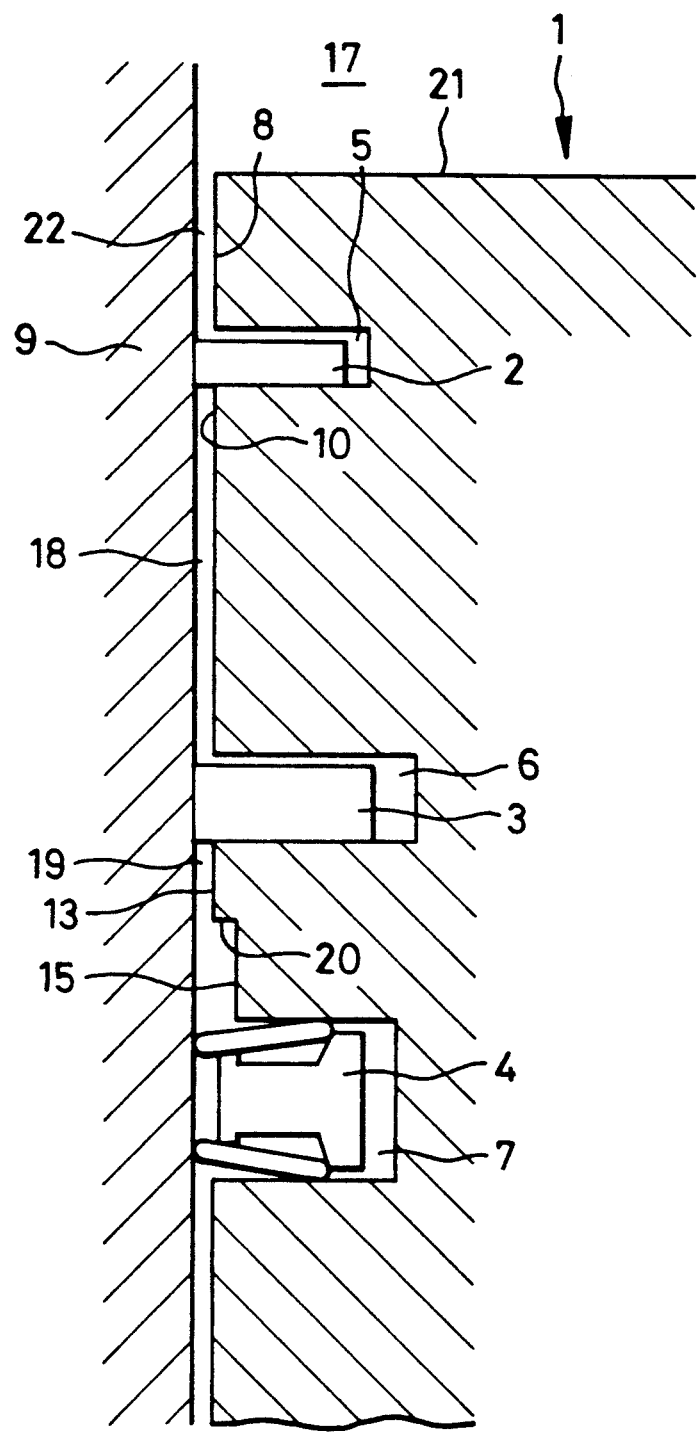
FIG. 10 is a sectional view showing an example of a cut for providing land space volume in a land located directly above an oil-ring groove in a piston according to the prior art.

In accordance with the arrangement of the invention as set forth above, oil is prevented from being drawn up and it is possible to greatly reduce the consumption of oil. FIG. 3 illustrates an example of the experimental results in which the piston of the invention was compared with a piston according to the prior art as shown in FIG. 10. More specifically, FIG. 3 is a graph in which the rate of oil consumption is plotted against a change in land volume ratio in case of high-speed, high-load operation using the piston of the invention shown in FIGS. 1 and 2 and the conventional piston, described in connection with FIG. 10, in which the portion of the land below the step 20 is uniformly cut away. The land volume ratio mentioned here refers to the ratio of the volume of groove 14 to the land space volume between the inner surface of the cylinder and the outer surface of the land in a case where there is no groove. It will be understood from FIG. 3 that when the land volume ratio is 80%, the oil consumption rate is approximately 60% with the prior art piston but is about 30% with the piston of the present invention. When the land volume ratio becomes 100%, oil consumption rate is about 50% with the prior art but only about 17% with the present invention. This represents a marked improvement over the prior art.

Thus, in accordance with the present invention as described above, it is possible to achieve a major reduction in oil consumption by providing the land located immediately above the oil-ring groove with an annular groove-shaped space the depth whereof becomes gradually larger from the outer circumferential surface of the piston toward the upper end of the land.

The annular recess is formed in the land without reaching the lower end face thereof so that the seating of the upper rail in a case where the oil ring is of the three-piece type is readily maintained.

Figure 4:
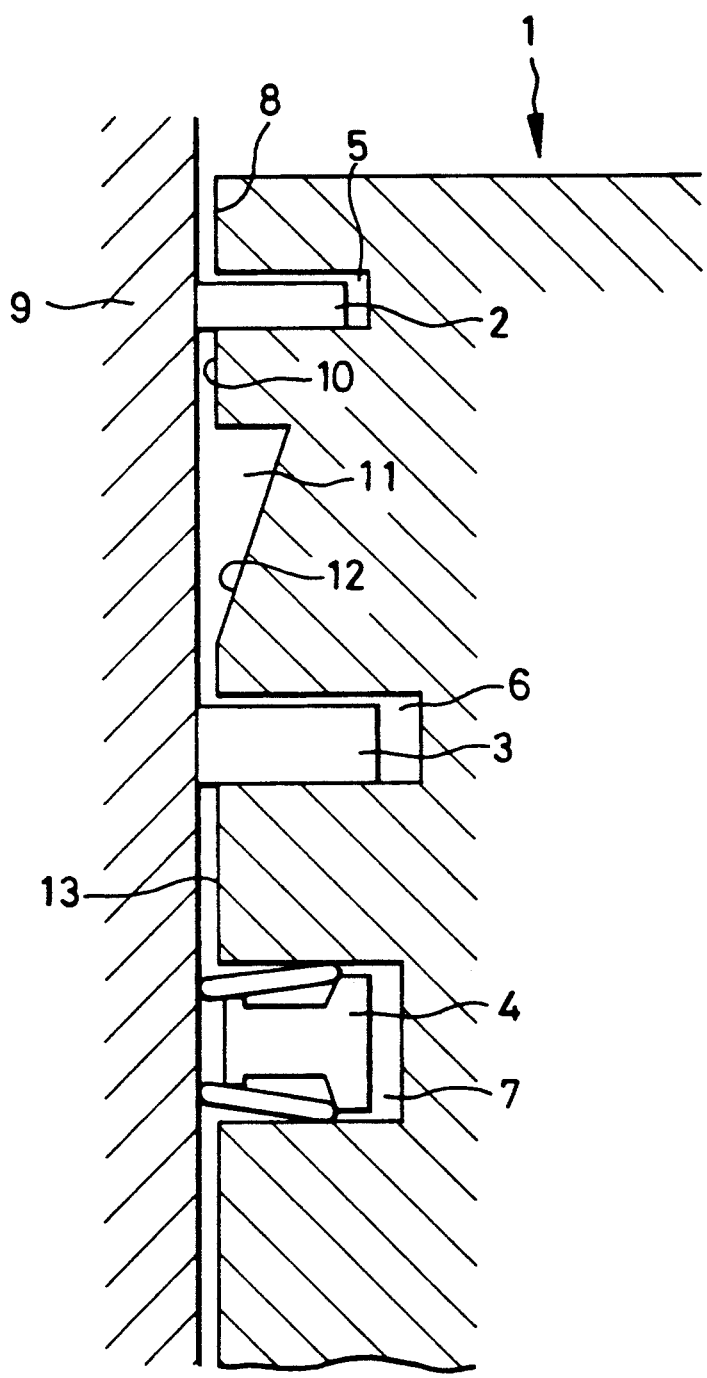
FIG. 4 is a sectional view illustrating a piston and a cylinder wherein a third embodiment of the present invention is included.

The third embodiment of the present invention is illustrated in FIG. 4 wherein an intermediate portion of the second land 10 is provided with an annular groove-shaped recess 11 defined by a step which cuts radially inwardly into the second land and a tapered flat surface 12 in cross section. The annular recess 11 is formed in the second land 10 without reaching an upper end face and a lower end face.

Figure 5:
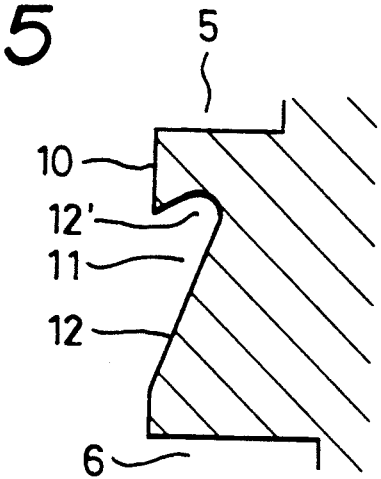
FIG. 5 is a sectional view illustrating a peripheral portion of a piston according to a fourth embodiment of the present invention.
Figure 6:
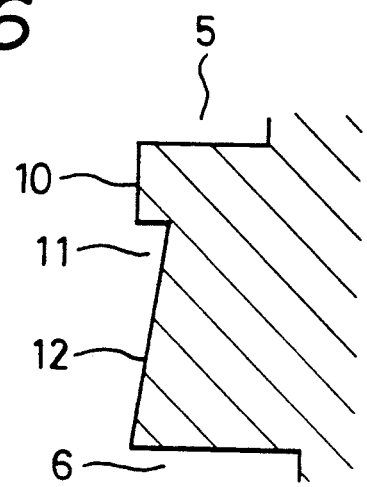
FIG. 6 is a sectional view illustrating a peripheral portion of a piston according to a fifth embodiment of the present invention.
Figure 7:
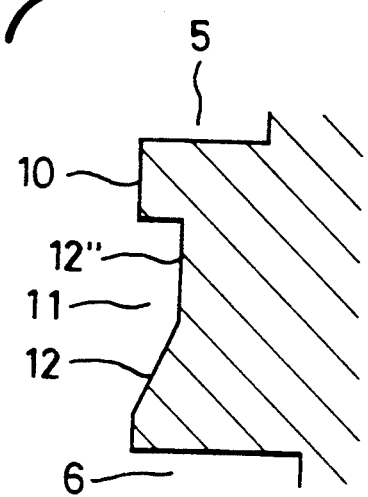
FIG. 7 is a sectional view illustrating a peripheral portion of a piston according to a sixth embodiment of the present invention.

FIG. 5 illustrates a fourth embodiment which is similar to that of FIG. 4, but including a circular arc portion 12' in place of the step in FIG. 4. FIG. 6 illustrates a fifth embodiment wherein the tapered flat surface 12 in cross section extends down to an outer edge of the upper wall of the second ring groove 6. FIG. 7 illustrates a sixth embodiment wherein the annular recess 11 is defined by a combination of the tapered flat surface 12 and an axial flat surface 12" in cross section.

Refer to FIG. 4 again, the dimension of the height of the top land 8 is less than 1/20 of a dimension of an inner diameter of the cylinder 9.

The top pressure ring 2 for use in a high top ring piston can be used, which has a dimension of thin width. As a result, the inertia force of the top pressure ring 2 can be made smaller.

Figure 8:
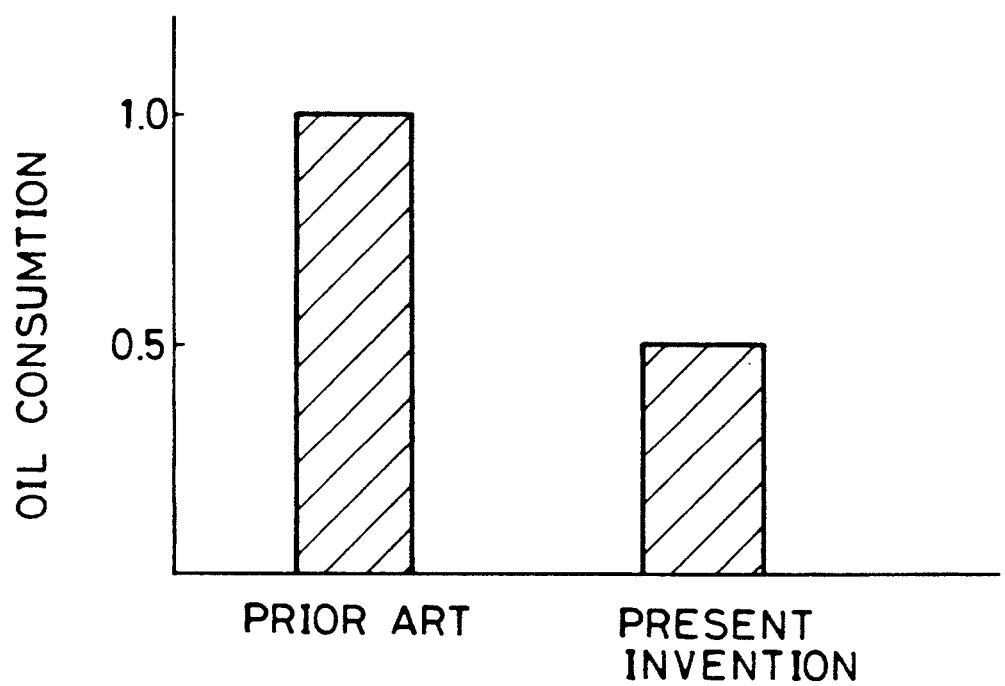
FIG. 8 is a graph showing an example of differences in oil consumption between a piston as shown in FIG. 4 and a prior art piston.

The effects obtained according to the embodiments as shown in FIGS. 4–7 are the same. The tests are conducted by using a gasoline engine (2000 cc) having cylinder dimensions of φ86 mm and a top land height of 3 mm. The top ring dimension is 0.8 mm in width for the embodiment as shown in FIG. 4 and 1.2 mm in width for a conventional piston which has no recess formed in the second land. The oil consumption under the load condition of 4/4×6000 rpm in case of said engines is seen in FIG. 8. The oil consumption rate according to the embodiment of FIG. 4 is about 50% of the prior art engine.

Figure 9:
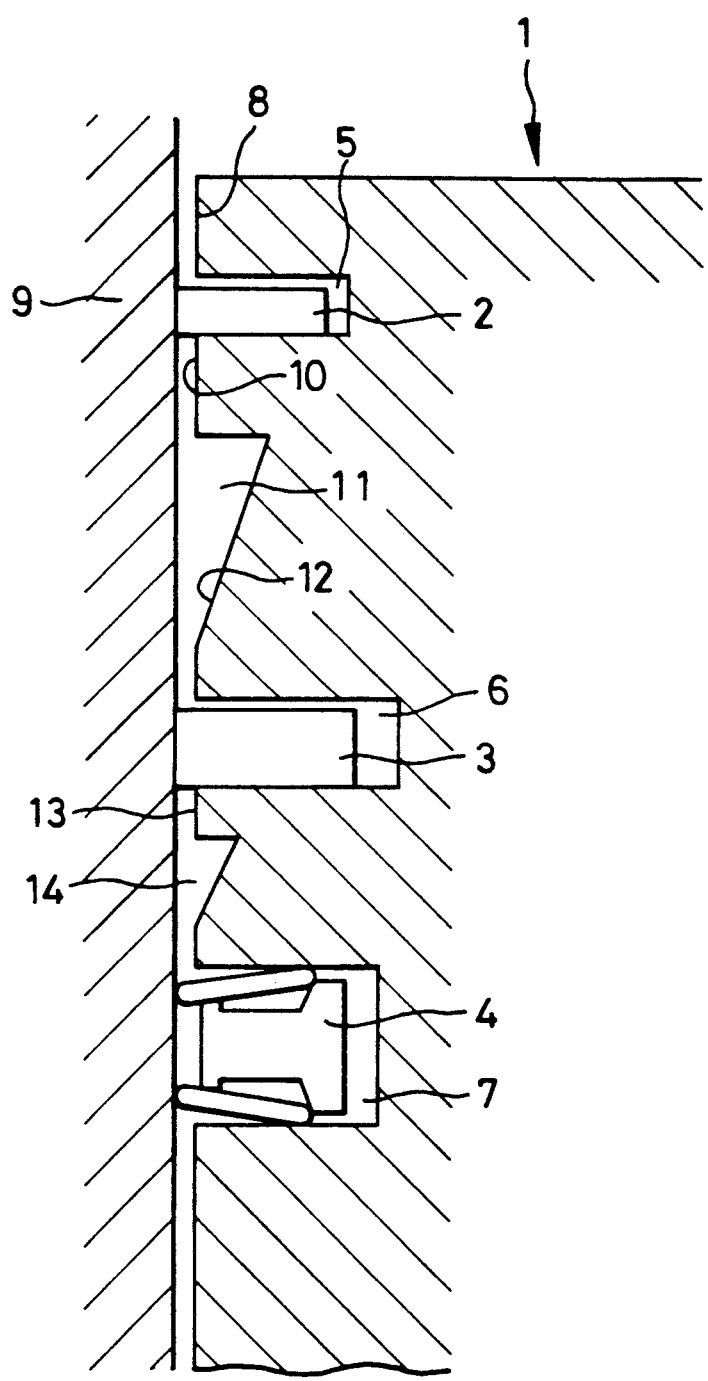
FIG. 9 is a sectional view illustrating a piston and a cylinder wherein a seventh embodiment is included.

FIG. 9 illustrates a seventh embodiment wherein the second land 10 is provided with the annular recess 11 and the third land is provided with the annular recess 14. This embodiment corresponds to a combination of the embodiments as shown in FIG. 1 and FIG. 4 and represents the combined results as obtained by the embodiments of FIG. 1 and FIG. 4.

As many apparently widely different embodiments of the present invention can be made without departing from the spirit and scope thereof, it is to be understood that the invention is not limited to the specific embodiments thereof except as defined in the appended claims.

What is claimed is:

1. A piston for an internal combustion engine, comprising:
    a piston body having an outer circumferential surface and provided with an oil-ring groove; and
    a land formed in said piston body directly above the oil-ring groove and having a circumferential surface that coincides with that of the piston body, said land having a lower end face and said land being provided with an annular groove-shaped recess that does not extend down to the lower end face of said land, said annular groove-shaped recess gradually increasing in radial depth upward along an axial direction of said piston body and sharply decreasing from a maximum depth at a top portion of said recess.

2. The piston according to claim 1, wherein the depth of said annular groove-shaped recess increases linearly.

3. The piston according to claim 1, wherein the depth of said annular groove-shaped recess increases non-linearly.

4. The piston according to claim 1, wherein the sharp decrease from a maximum depth is a step.

5. A piston for an internal combustion engine, comprising:
    a piston body having an outer circumferential surface and provided with a top pressure ring groove; and
    a land formed in said piston body directly below said top pressure ring groove and having a circumferential surface that coincides with that of the piston body, said land having an upper end flat face and being provided with an annular groove-shaped recess that does not extend up to the upper end flat face of said land, said annular groove-shaped recess gradually increasing in radial depth upward along an axial direction of said piston body and sharply decreasing from a maximum depth at a top portion of said recess.

6. The piston according to claim 5, wherein a dimension of a height of a top land located directly above said top pressure ring is less than 1/20 of a dimension of an inner diameter of the cylinder wherein the piston is reciprocated.

7. The piston according to claim 6, wherein said annular groove-shaped recess is linearly increasing in depth from an upper edge of a second ring groove formed in said piston body.

8. The piston according to claim 5, wherein the sharp decrease from a maximum depth is a step.

9. A piston for an internal combustion engine, comprising:
    a piston body having an outer circumferential surface and provided with a top pressure ring groove, a second pressure ring groove, and an oil ring groove;
    a top land formed in said piston body above said top pressure ring groove and having a circumferential surface that coincides with that of the piston body;
    a second land formed in said piston body between said top pressure ring groove and said second pressure ring groove and having a circumferential surface that coincides with that of the piston body; and
    a third land formed in said piston body directly above said oil ring groove and having a circumferential surface that coincides with that of the piston body;
    said second land having an annular groove-shaped recess gradually increasing in depth upward along an axial direction of said piston body,
    said third land having an annular groove-shaped recess gradually increasing in depth upward along an axial direction of said piston body.

* * * * *